(12) United States Patent
Kang et al.

(10) Patent No.: US 12,129,005 B2
(45) Date of Patent: Oct. 29, 2024

(54) MARINE TESTBED AND MARINE TEST METHOD FOR PROVIDING MARINE VERIFICATION AND SECURING TRACK RECORD OF ECO-FRIENDLY PROPULSION SYSTEM FOR SHIP

(71) Applicant: Korea Institute of Ocean Science & Technology, Busan (KR)

(72) Inventors: Hee Jin Kang, Gyeryong (KR); Young Shik Kim, Daejeon (KR); Hyung Won Shim, Sejong (KR); So Young Sung, Seoul (KR); Jang Pyo Hong, Daejeon (KR); Yun Ho Kim, Daejeon (KR)

(73) Assignee: Korea Institute of Ocean Science & Technology, Busan (KR)

( * ) Notice: Subject to any disclaimer, the term of this patent is extended or adjusted under 35 U.S.C. 154(b) by 0 days.

(21) Appl. No.: 17/607,269

(22) PCT Filed: Aug. 29, 2020

(86) PCT No.: PCT/KR2020/011588
§ 371 (c)(1),
(2) Date: Oct. 28, 2021

(87) PCT Pub. No.: WO2022/045410
PCT Pub. Date: Mar. 3, 2022

(65) Prior Publication Data
US 2023/0174214 A1    Jun. 8, 2023

(30) Foreign Application Priority Data
Aug. 24, 2020 (KR) ........................ 10-2020-0106031

(51) Int. Cl.
*B63H 21/17*    (2006.01)
*B63H 21/00*    (2006.01)
(Continued)

(52) U.S. Cl.
CPC ............ *B63H 21/17* (2013.01); *G01M 10/00* (2013.01); *G01M 15/04* (2013.01);
(Continued)

(58) Field of Classification Search
CPC .............. B63H 21/17; B63H 2021/003; B63H 2021/205; G01M 10/00; G01M 15/04;
(Continued)

(56) References Cited

PUBLICATIONS

Yang, Geun Ryoung; An, Sang Yong; Choo, Jin Hoon, "A Feasibility Study of Low-Cost Hybrid Fuel-Cell System for Ship Auxiliary Power", New and Renewable Energy, Dec. 2013, vol. 9 No. 4, pp. 3-12, (Year: 2013).*

(Continued)

*Primary Examiner* — Anthony D Wiest

(57) ABSTRACT

Provided are a marine testbed and a marine test method for providing marine verification and securing a track record of an eco-friendly propulsion system for a ship, wherein the marine testbed and the marine test method test and evaluate applicability of a hybrid propulsion system to the ship and facilitate securing of a track record, the hybrid propulsion system utilizing a battery, a fuel cell, a zero-carbon fuel engine, a zero-carbon fuel mixed-combustion engine, and a heterogeneous eco-friendly alternative fuel for the ship which are essential for developing an eco-friendly ship.

6 Claims, 4 Drawing Sheets

(51) Int. Cl.
    *B63H 21/20*     (2006.01)
    *G01M 10/00*     (2006.01)
    *G01M 15/04*     (2006.01)
    *H01M 8/04313*     (2016.01)

(52) U.S. Cl.
    CPC ... *H01M 8/04313* (2013.01); *B63H 2021/003* (2013.01); *B63H 2021/205* (2013.01)

(58) Field of Classification Search
    CPC .... H01M 8/04313; B63J 3/04; H02J 2310/42; H02J 5/00; Y02E 60/50; Y02T 70/5236
    See application file for complete search history.

(56) References Cited

PUBLICATIONS

Park, Ki-Do et al., "Experimental Study on Development of a Marine Hybrid Power System", Journal of the Korean Society of Marine Engineering, Jul. 2017, vol. 41, No. 6, pp. 495-500 (Year: 2017).*

Choi, Gunho et al., "The Research of Engine Performance and Emission Characteristics on CNG/Diesel Dual-Fuel Engine by CNG Mixing Ratio", Transaction of Koreas Society of Automotive Engineers, vol. 19, No. 3, pp. 38-43, 2011 (Year: 2011).*

* cited by examiner

MARINE TESTBED AND MARINE TEST METHOD FOR PROVIDING MARINE VERIFICATION AND SECURING TRACK RECORD OF ECO-FRIENDLY PROPULSION SYSTEM FOR SHIP

TECHNICAL FIELD

The present disclosure relates to a marine testbed and a marine test method for providing marine verification and securing a track record of an eco-friendly propulsion system for a ship. More particularly, the present disclosure relates to a marine testbed and a marine test method for providing marine verification and securing a track record of an eco-friendly propulsion system for a ship, wherein the marine testbed and the marine test method test and evaluate applicability of a hybrid propulsion system to the ship and facilitate securing of a track record, the hybrid propulsion system utilizing a battery, a fuel cell, a zero-carbon fuel engine, a zero-carbon fuel mixed-combustion engine, and a heterogeneous eco-friendly alternative fuel for the ship which are essential for developing an eco-friendly ship.

BACKGROUND ART

As the International Maritime Organization (IMO) have decided to reduce the amount of greenhouse gas emitted from ships by 50% or more of the amount in 2008 by 2050, ships emitting carbon dioxide at or above a particular level are no longer built or operated. In Europe, development of technologies for a battery or fuel cell, and a zero-carbon fuel combustion engine is in progress to develop eco-friendly ships, and multiple test ships utilizing batteries or fuel cells as a propulsion power source are built and are in operation. This is because even for a marine fuel cell and battery for a ship of which their safety has been verified on land, if the fuel cell and battery are applied to an actual ship and operated, it is difficult to fully consider influences of six degrees of freedom movement of the ship caused by waves, occurrence of vertical/horizontal acceleration, salty outside air, and vibration, which requires considerable cost and time.

The timed required for a ship to be designed and built is usually two to three years or longer. If it is necessary to comply with the case of Europe in which a test ship is designed, built, and operated each time a new eco-friendly alternative fuel technology is developed, mounting the eco-friendly alternative fuel technology developed by small and medium companies on actual ships for operation and securing track records for export are accompanied by costs ranging from billions to tens of billions of won and time burden of three or more years.

DISCLOSURE

Technical Problem

Accordingly, the present disclosure has been made keeping in mind the above problems occurring in the related art, and the present disclosure is directed to providing a marine testbed and a marine test method for providing marine verification and securing a track record of an eco-friendly propulsion system for a ship, wherein the marine testbed and the marine test method test and evaluate applicability of a hybrid propulsion system to the ship and facilitate securing of a track record, the hybrid propulsion system utilizing a battery, a fuel cell, a zero-carbon fuel engine, a zero-carbon fuel mixed-combustion engine, and a heterogeneous eco-friendly alternative fuel for the ship which are essential for developing an eco-friendly ship.

Technical Solution

According to an embodiment of the present disclosure, there is provided a marine testbed for providing marine verification and securing a track record of an eco-friendly propulsion system for a ship, the marine testbed including: a power provider connected to a main generator of the ship equipped with an electric propulsion system, and provided to be used as a propulsion power source of the ship, replacing power production from the main generator; and a ship applicability evaluator performing one or more ship application tests in a propulsion process of the ship through the power provider and determining whether the power provider is allowed to be used as the propulsion power source of the ship.

In an embodiment, the power provider may include any one or more of the following: one or more fuel cell, a battery, a zero-carbon fuel engine, and a zero-carbon fuel mixed-combustion engine.

In an embodiment, the power provider may be electrically connected to a DC grid-based distribution board or an AC grid-based distribution board connected to the main generator of the ship.

In an embodiment, while the one or more fuel cells of the power provider are connected to the DC grid-based distribution board, when power is provided replacing the power production from the main generator, the ship applicability evaluator may measure and record output stability, a fuel consumption rate, temperature, and humidity of the one or more fuel cells.

In an embodiment, while the battery of the power provider is connected to the DC grid-based distribution board, when power is provided replacing the power production from the main generator, the ship applicability evaluator may measure and record output stability, a fuel consumption rate, temperature, and humidity of the battery.

In an embodiment, when the zero-carbon fuel engine or the zero-carbon fuel mixed-combustion engine of the power provider provides power replacing the power production from the main generator, the ship applicability evaluator may acquire information on a cooling water temperature, a lubricating oil temperature, and RPM from a machinery control system (MCS) connected to the main generator.

In an embodiment, when the zero-carbon fuel engine or the zero-carbon fuel mixed-combustion engine of the power provider provides power replacing the power production from the main generator, the ship applicability evaluator may acquire information on whether fuel slip has occurred and on exhaust material emission from one or more sensors pre-installed in the ship.

In an embodiment, the ship applicability evaluator may perform any one or more of the following tests: a rated-current/full-load test, a short-circuit current test, a charging and recharging energy test, a DC and AC side overvoltage and undervoltage protection function test, a frequency rise and fall protection function test, a temperature rise test, a system voltage momentary-power-failure and momentary-drop test, a test for efficiency, a power factor measurement test, an input power sudden-change test, a system voltage sudden-change test, a system voltage phase sudden-change test, an electric-shock protection test, an output short-circuit test, and an output overload test.

According to another embodiment of the present disclosure, there is provided a marine test method for providing marine verification and securing a track record of an eco-friendly propulsion system for a ship, the marine test method including: providing, by a power provider connected to a main generator of the ship equipped with an electric propulsion system, power as a propulsion power source of the ship, replacing power production from the main generator; and performing, by a ship applicability evaluator in a propulsion process of the ship through the power provider, one or more ship application tests and determining whether the power provider is allowed to be used as the propulsion power source of the ship.

Advantageous Effects

According to an aspect of the present disclosure, a plurality of fuel cells, a battery, a zero-carbon fuel engine, and a zero-carbon fuel mixed-combustion engine are mounted on a ship equipped with an electric propulsion system, and 0 to 100% of the power production of a main generator of the ship is replaced and supplied without any limitation. The following can be verified on the sea: whether the researched and developed fuel cells, battery, and mixed-combustion engine are able to replace a generator or main generator for supplying the service power to the ship, whether there is a risk of fire, explosion, or a short circuit during operation, and whether designed reliability is ensured. In addition, a track record can be secured.

In addition, according to an aspect of the present disclosure, a reliability and safety evaluation facility utilized as a power generation source for various types of electric motors, for inverters, and for the electric propulsion system is installed together, so that a test, verification, and a track record can be secured.

MODE FOR INVENTION

Hereinafter, an exemplary embodiment will be provided to help understanding of the present disclosure. However, the embodiment below is only provided for easier understanding of the present disclosure, and does not limit the content of the present disclosure.

Figure 1:
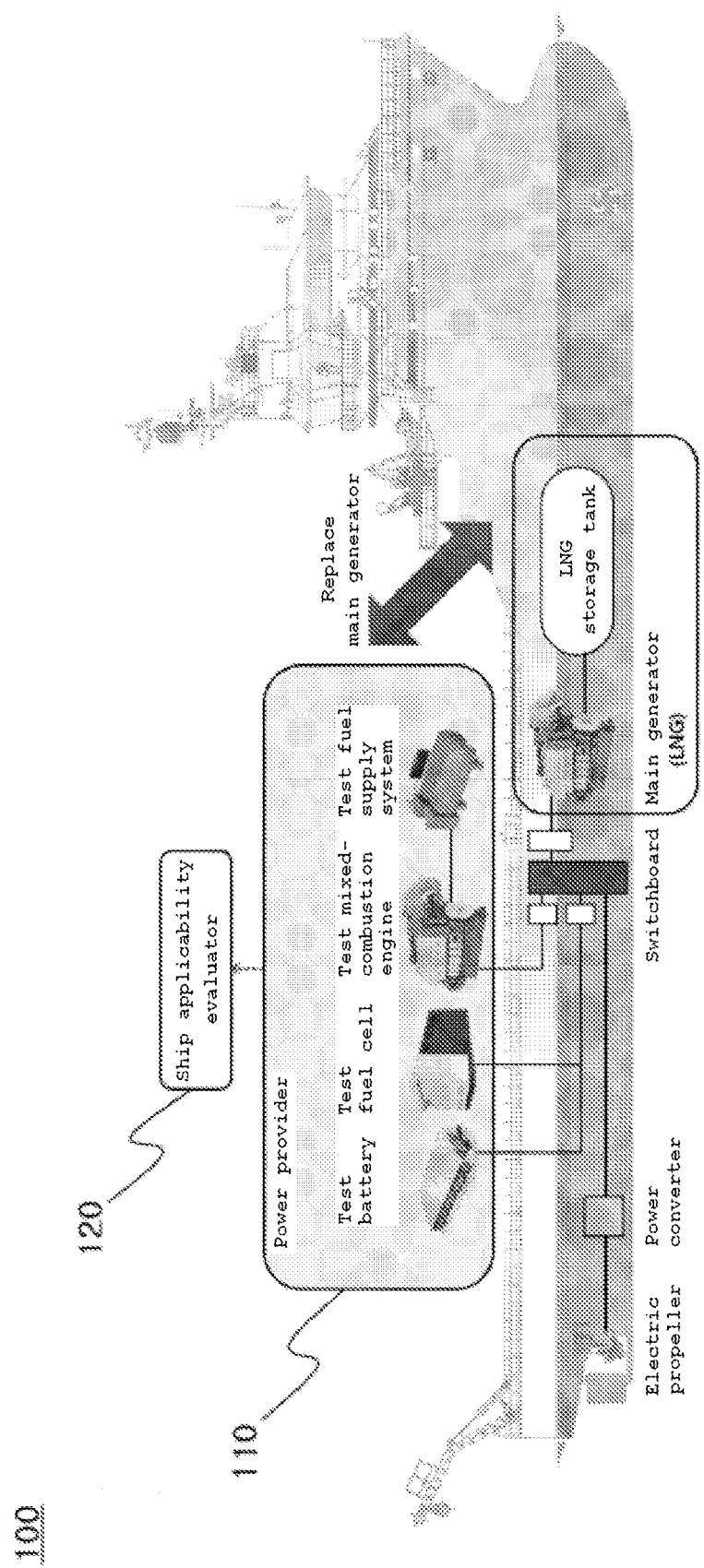
FIG. 1 is a diagram illustrating a configuration of a marine testbed 100 for providing marine verification and securing a track record of an eco-friendly propulsion system for a ship, according to an embodiment of the present disclosure.
Figure 2:
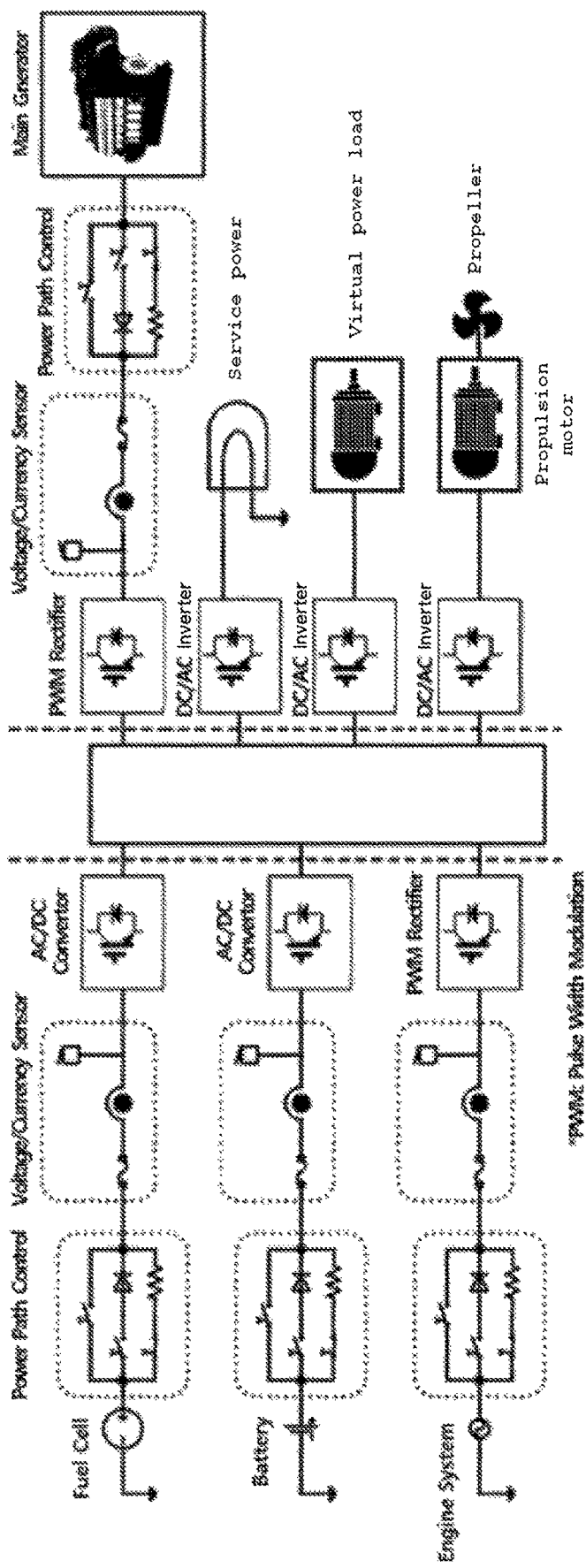
FIG. 2 is a diagram illustrating a systematic configuration of the marine testbed 100 for providing the marine verification and securing the track record of the eco-friendly propulsion system for the ship shown in FIG. 1.

FIG. 1 is a diagram illustrating a configuration of a marine testbed 100 for providing marine verification and securing a track record of an eco-friendly propulsion system for a ship, according to an embodiment of the present disclosure. FIG. 2 is a diagram illustrating a systematic configuration of the marine testbed 100 for providing the marine verification and securing the track record of the eco-friendly propulsion system for the ship shown in FIG. 1.

Referring to FIGS. 1 and 2, according to an embodiment of the present disclosure, a marine testbed 100 for providing marine verification and securing a track record of an eco-friendly propulsion system for a ship schematically includes a power provider 110 and a ship applicability evaluator 120.

First, the power provider 110 is connected to a main generator of a ship equipped with an electric propulsion system. The power provider 110 is provided to be used as a propulsion power source of the ship, replacing the power production from the main generator.

More specifically, the ship equipped with the electric propulsion system uses fuel in a fuel tank and the main generator to generate the power required for operation. The power provider 110 of the present disclosure is connected to the main generator such that the power provider 110 produces power available as the propulsion power source of the ship, replacing 0 to 100% of the power production of the main generator.

The power provider 110 includes a plurality of fuel cells, a battery, a zero-carbon fuel engine, and a zero-carbon fuel mixed-combustion engine. Therefore, the ship applicability evaluator 120, which will be described later, performs tests and determines, through various tests, whether the power provider 110 is able to sufficiently replace the power production from the main generator of the ship within the range of 0 to 100% and to bear a part of the power load.

The power provider 110 is electrically connected to a DC grid-based distribution board or to an AC grid-based distribution board connected to the main generator of the ship, which will be described later. In the meantime, the word "distribution board" may mean a switchboard (EMS) installed on a shelf.

The ship applicability evaluator 120 performs various ship application tests in the propulsion process of the ship through the power provider 110 or in the process of replacing the power production of the main generator, so as to verify, on the sea, whether the power provider 110 is allowed to be used as the propulsion power source of the ship by replacing the main generator, whether there is a risk of fire, explosion, or a short circuit during operation, and whether designed reliability is ensured. In addition, the ship applicability evaluator 120 secures a track record. This will be described in more detail with reference to FIGS. 3 and 4.

Figure 3:
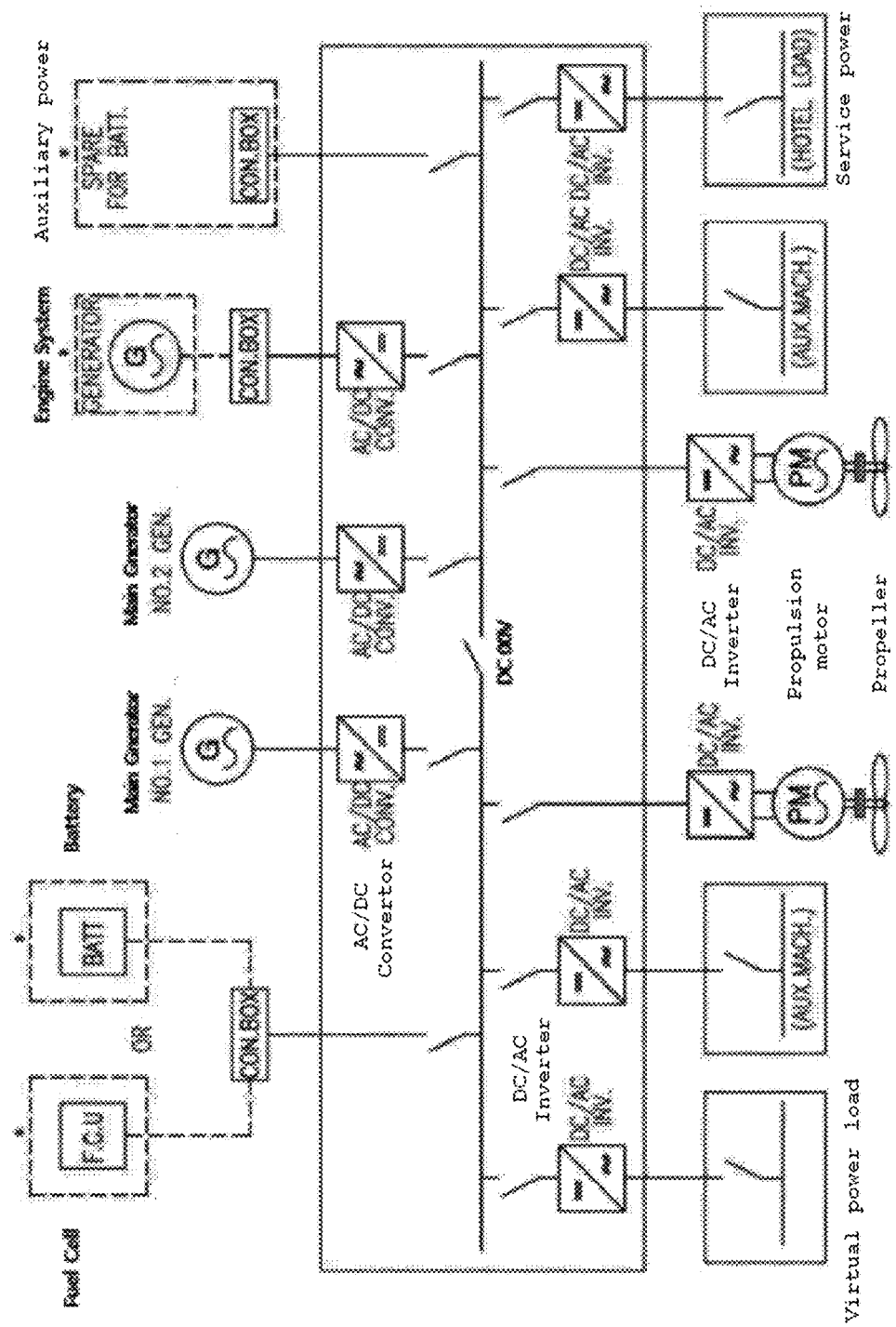
FIG. 3 is a diagram illustrating a configuration in which a power provider 110 of FIG. 1 is connected to a DC grid-based distribution board.
Figure 4:
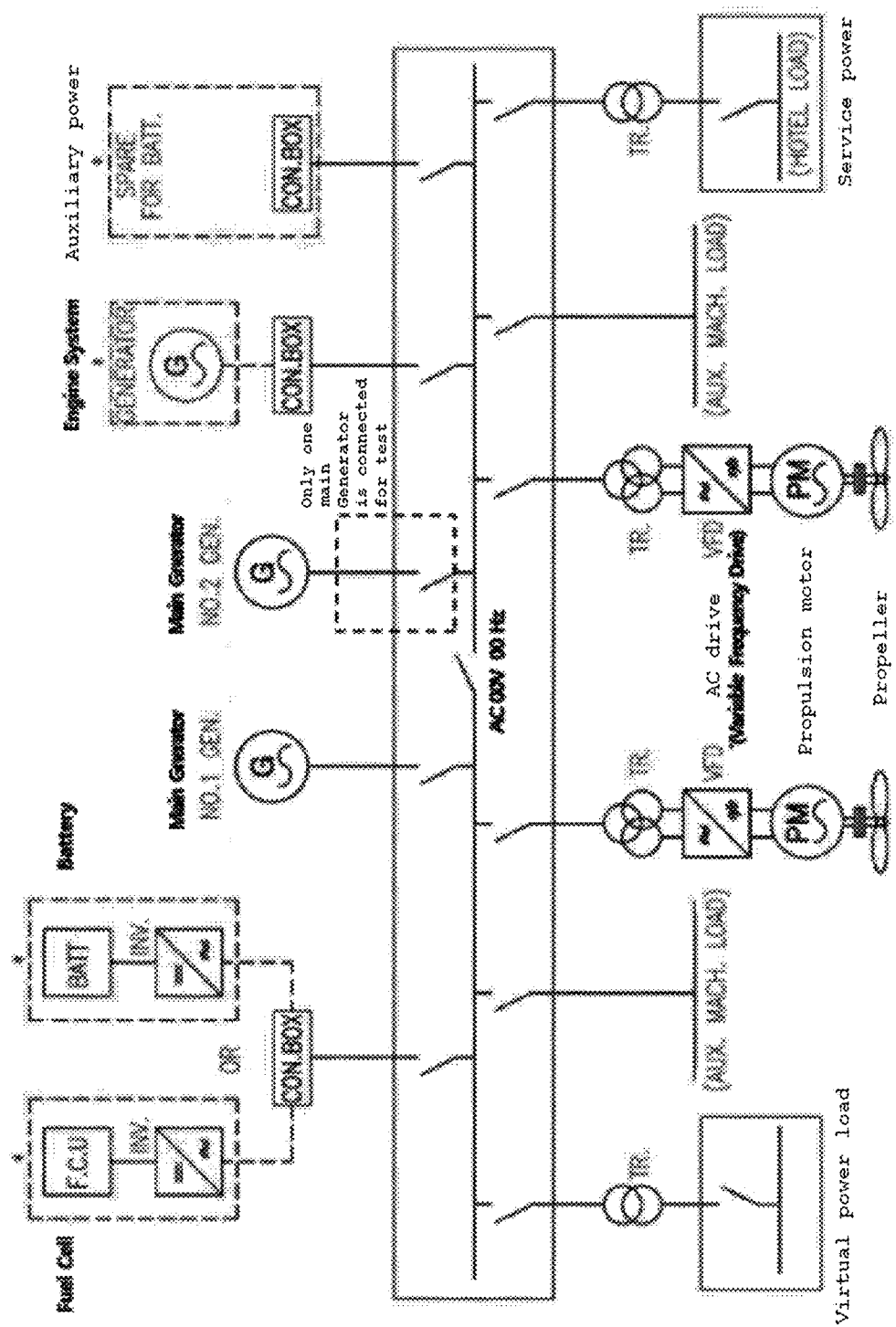
FIG. 4 is a diagram illustrating a configuration in which a power provider 110 of FIG. 1 is connected to an AC grid-based distribution board.

FIG. 3 is a diagram illustrating a configuration in which the power provider 110 of FIG. 1 is connected to the DC grid-based distribution board. FIG. 4 is a diagram illustrating a configuration in which the power provider 110 of FIG. 1 is connected to the AC grid-based distribution board.

Referring to FIG. 3, the fuel cells, the battery, the zero-carbon fuel engine, and the zero-carbon fuel mixed-combustion engine of the power provider 110 are electrically connected to the DC grid-based distribution board. Herein, in the DC grid-based distribution board, a DC/AC inverter is provided for each load.

Herein, while the fuel cells and the DC grid-based distribution board are electrically connected to each other, when the fuel cells provide power replacing power production from the main generator, the ship applicability evaluator 120 verifies the operation reliability by recording environmental conditions, such as the output safety, fuel consumption rate, temperature, and humidity of the fuel cells.

In addition, while the battery and the DC grid-based distribution board are electrically connected to each other, when the battery provides power replacing the power production from the main generator, the ship applicability evaluator 120 verifies the operation reliability by recording environmental conditions, such as the output safety, fuel consumption rate, temperature, and humidity of the battery.

In addition, when the zero-carbon fuel engine or the zero-carbon fuel mixed-combustion engine of the power provider provides power replacing the power production from the main generator, the ship applicability evaluator 120 acquires information on a cooling water temperature, a lubricating oil temperature, and RPM from a machinery control system (MCS) connected to the main generator.

In an embodiment, the ship applicability evaluator 120 is connected to pipes pre-installed in the ship for supplying lubricating oil, cooling water, and fuel, and is provided to be connected to its own chimney (exhaust pipe) or a chimney installed in the ship. Herein, the ship applicability evaluator 120 may acquire information on whether fuel slip has occurred and on exhaust material emission from one or more sensors pre-installed in the ship. Herein, the information on exhaust material emission means information on NOx, SOx, PM, and GHG.

In addition, as shown in FIG. 4, the ship applicability evaluator 120 is connected to the AC grid-based distribution board. For marine verification in which the power of the main generator is completely replaced by the fuel cells, the large-capacity battery, and the mixed-combustion engine, the ship applicability evaluator 120 may be connected to a main propulsion generator of the ship through the AC grid-based distribution board. In this case, to prevent operation inability and drifting of the ship caused by a short circuit, the ship applicability evaluator 120 is connected only to any one of main generators on two axes.

In addition, in an embodiment, to support a test of an integrated load equal to or greater than the capacity of the main propulsion generator of the ship, the DC grid of the marine testbed according to the present disclosure may be configured to provide a power load of or greater than power generation capacity of the main propulsion generator of the ship.

Although the present disclosure has been described with reference to the exemplary embodiments, those skilled in the art will appreciate that various modifications and variations can be made in the present disclosure without departing from the spirit or scope of the disclosure described in the appended claims.

INDUSTRIAL APPLICABILITY

According to the present disclosure, applicability of a hybrid propulsion system to a ship is tested and evaluated and securing a track record is facilitated, the hybrid propulsion system utilizing a battery, a fuel cell, a zero-carbon fuel engine, a zero-carbon fuel mixed-combustion engine, and a heterogeneous eco-friendly alternative fuel for the ship which are essential for developing an eco-friendly ship. Therefore, the present disclosure is a technology that can be widely used in the field of shipbuilding and marine industry and can realize its practical and economical value.

The invention claimed is:

1. A marine testbed for providing marine verification and securing a track record of an eco-friendly propulsion system for a ship, the marine testbed comprising:
    a power provider connected to a main generator of the ship equipped with an electric propulsion system, and provided to be used as a propulsion power source of the ship, replacing power production from the main generator; and
    a ship applicability evaluator performing one or more ship application tests in a propulsion process of the ship through the power provider and determining whether the power provider is allowed to be used as the propulsion power source of the ship,
    wherein the power provider comprises any one or more of the following: one or more fuel cells; a battery; a zero-carbon fuel engine; and a zero-carbon fuel mixed-combustion engine, and the power provider is electrically connected to a DC grid-based distribution board or an AC grid-based distribution board connected to the main generator of the ship,
    wherein while the one or more fuel cells of the power provider are connected to the DC grid-based distribution board, when power is provided replacing the power production from the main generator, the ship applicability evaluator measures and records output stability, a fuel consumption rate, temperature, and humidity of the one or more fuel cells,
    wherein while the battery of the power provider is connected to the DC grid-based distribution board, when power is provided replacing the power production from the main generator, the ship applicability evaluator measures and records output stability, a fuel consumption rate, temperature, and humidity of the battery,
    wherein when the zero-carbon fuel engine or the zero-carbon fuel mixed-combustion engine of the power provider provides power replacing the power production from the main generator, the ship applicability evaluator acquires information on a cooling water temperature, a lubricating oil temperature, and RPM from a machinery control system (MCS) connected to the main generator,
    wherein when the zero-carbon fuel engine or the zero-carbon fuel mixed-combustion engine of the power provider provides power replacing the power production from the main generator, the ship applicability evaluator acquires information on whether fuel slip has occurred and on exhaust material emission from one or more sensors pre-installed in the ship,
    wherein the main generator includes two main generators, and
    wherein the ship application evaluator is installed at the ship and connected to only one of the two main generators on two axes of the ship.

2. The marine testbed of claim 1, wherein the ship applicability evaluator performs any one or more of the following tests: a rated-current/full-load test, a short-circuit current test, a charging and recharging energy test, a DC and AC side overvoltage and undervoltage protection function test, a frequency rise and fall protection function test, a temperature rise test, a system voltage momentary-power-failure and momentary-drop test, a test for efficiency, a power factor measurement test, an input power sudden-change test, a system voltage sudden-change test, a system voltage phase sudden-change test, an electric-shock protection test, an output short-circuit test, and an output overload test.

3. The marine testbed of claim 1, wherein the ship application evaluator is connected to only one of the two main generators through the AC grid-based distribution board.

4. The marine testbed of claim 3, wherein the two main generators are coupled to the AC grid-based distribution board through the two axes.

5. A marine test method for providing marine verification and securing a track record of an eco-friendly propulsion system for a ship, the marine test method comprising:

providing, by a power provider connected to a main generator of the ship equipped with an electric propulsion system, power as a propulsion power source of the ship, replacing power production from the main generator; and performing, by a ship applicability evaluator in a propulsion process of the ship through the power provider, one or more ship application tests and determining whether the power provider is allowed to be used as the propulsion power source of the ship, wherein the power provider comprises any one or more of the following: one or more fuel cells; a battery; a zero-carbon fuel engine; and a zero-carbon fuel mixed-combustion engine, and the power provider is electrically connected to a DC grid-based distribution board or an AC grid-based distribution board connected to the main generator of the ship, wherein while the one or more fuel cells of the power provider are connected to the DC grid-based distribution board, when power is provided replacing the power production from the main generator, the ship applicability evaluator measures and records output stability, a fuel consumption rate, temperature, and humidity of the one or more fuel cells, wherein while the battery of the power provider is connected to the DC grid-based distribution board, when power is provided replacing the power production from the main generator, the ship applicability evaluator measures and records output stability, a fuel consumption rate, temperature, and humidity of the battery, wherein when the zero-carbon fuel engine or the zero-carbon fuel mixed-combustion engine of the power provider provides power replacing the power production from the main generator, the ship applicability evaluator acquires information on a cooling water temperature, a lubricating oil temperature, and RPM from a machinery control system (MCS) connected to the main generator, wherein when the zero-carbon fuel engine or the zero-carbon fuel mixed-combustion engine of the power provider provides power replacing the power production from the main generator, the ship applicability evaluator acquires information on whether fuel slip has occurred and on exhaust material emission from one or more sensors pre-installed in the ship, wherein the main generator includes two main generators, and wherein the ship application evaluator is installed at the ship and connected to only one of the two main generators on two axes of the ship.

6. A marine testbed for providing marine verification and securing a track record of an eco-friendly propulsion system for a ship, the marine testbed comprising:

a power provider connected to a main generator of the ship equipped with an electric propulsion system, and provided to be used as a propulsion power source of the ship, replacing power production from the main generator; and a ship applicability evaluator performing one or more ship application tests in a propulsion process of the ship through the power provider and determining whether the power provider is allowed to be used as the propulsion power source of the ship, wherein the power provider comprises any one or more of the following: one or more fuel cells; a battery; a zero-carbon fuel engine; and a zero-carbon fuel mixed-combustion engine, and the power provider is electrically connected to an AC grid-based distribution board connected to the main generator of the ship, wherein when the zero-carbon fuel engine or the zero-carbon fuel mixed-combustion engine of the power provider provides power replacing the power production from the main generator, the ship applicability evaluator acquires information on a cooling water temperature, a lubricating oil temperature, and RPM from a machinery control system (MCS) connected to the main generator, wherein when the zero-carbon fuel engine or the zero-carbon fuel mixed-combustion engine of the power provider provides power replacing the power production from the main generator, the ship applicability evaluator acquires information on whether fuel slip has occurred and on exhaust material emission from one or more sensors pre-installed in the ship, wherein the main generator includes two main generators, and wherein the ship application evaluator is installed at the ship and connected to only one of the two main generators on two axes of the ship through the AC grid-based distribution board.

* * * * *